INVENTORS
JULIAN P. OVREBO
REX C. WOOD
BY
*Kenneth D. Ohm*
ATTORNEY

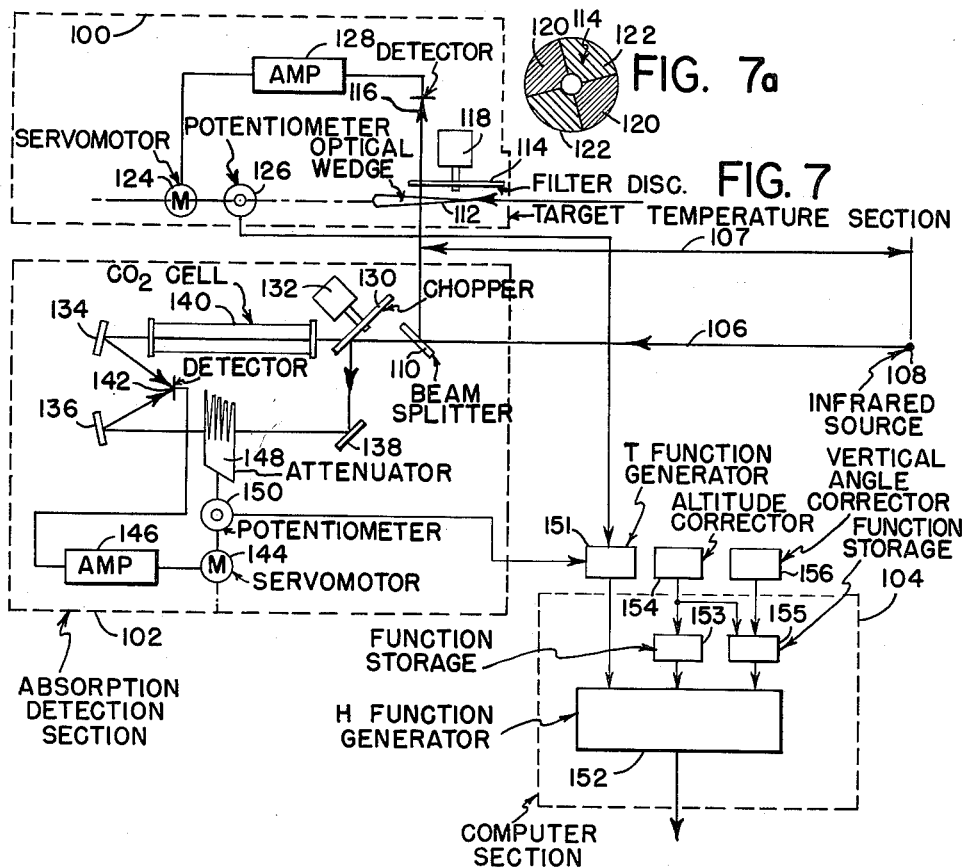
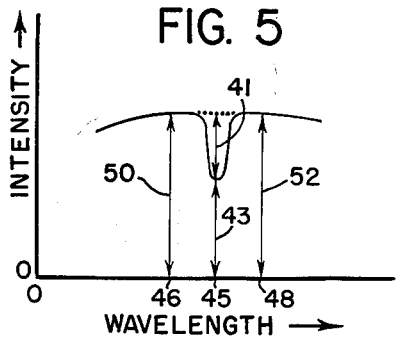
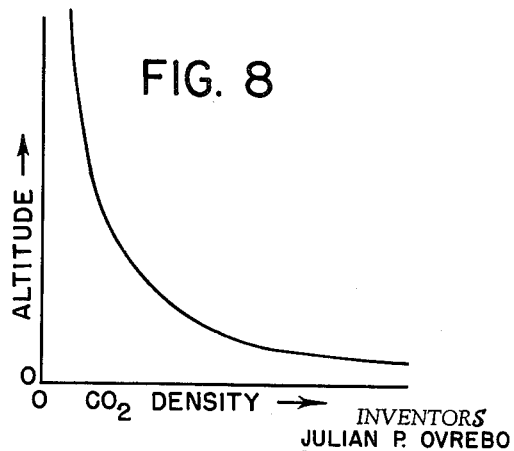

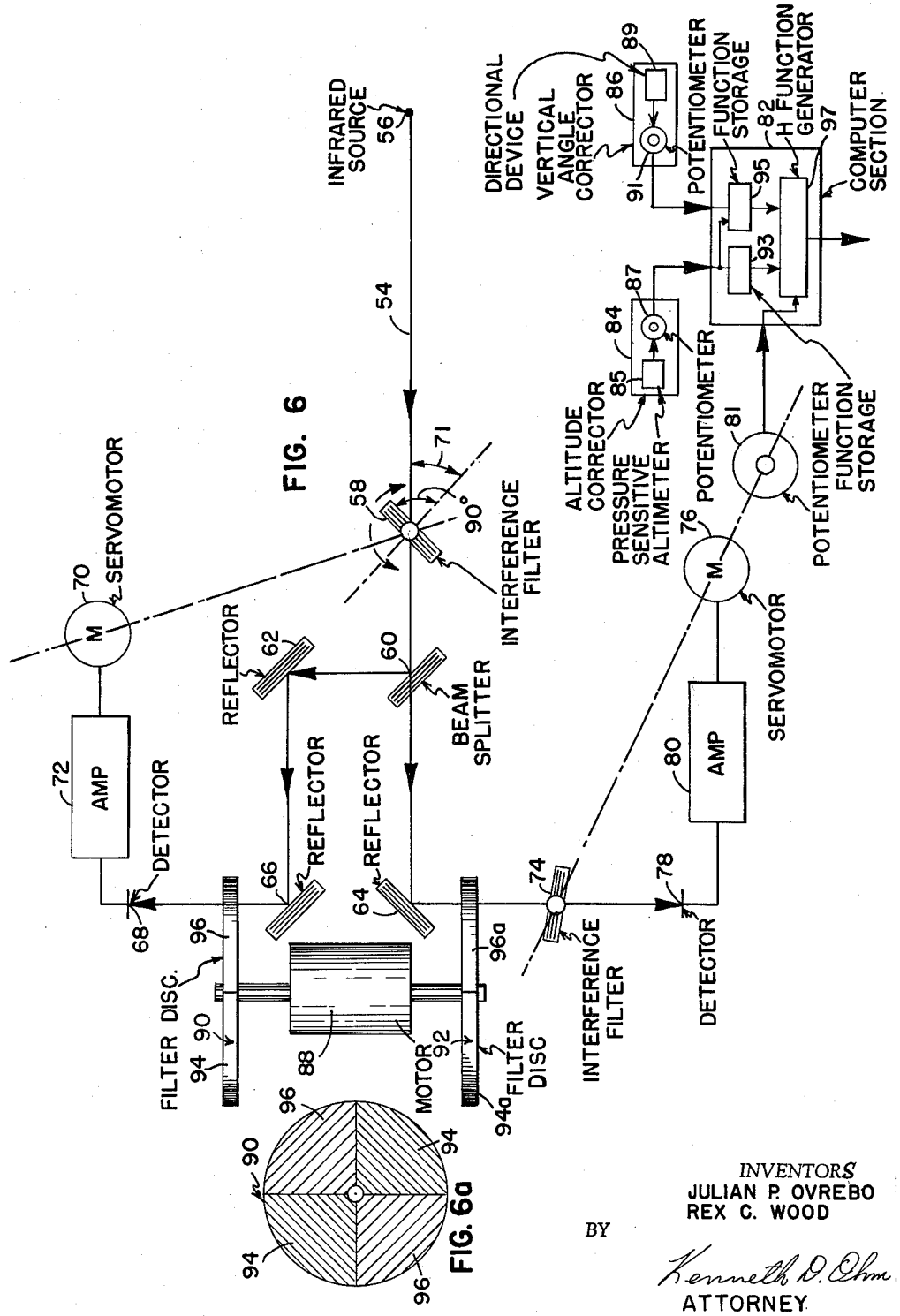

3,103,586
PASSIVE INFRARED RANGING DEVICE USING ABSORPTION BANDS OF WATER VAPOR OR CARBON DIOXIDE
Julian P. Ovrebo, Minneapolis, and Rex C. Wood, New Brighton, Minn., assignors to General Mills, Inc., a corporation of Delaware
Filed Dec. 8, 1958, Ser. No. 778,989
17 Claims. (Cl. 250—83.3)

The present invention relates to measuring distance and more particularly to determining the distance or range to an object by the use of infrared rays emitted by said object.

The existing methods for determining the distance or range to an object by the use of radar or radio direction-finding equipment are susceptible to a variety of jamming techniques. These techniques either totally disable or render unreliable such methods. Furthermore, radar tends to reveal itself by transmitting signals while in the act of locating objects. Since all hot bodies emit infrared radiation, an infrared ranging system need not transmit rays to obtain a reflection in order to measure distance. Thus a passive infrared ranging device will not reveal itself.

The electromagnetic radiation emitted by hot bodies is identical with visible light in all respects except that it consists mostly of wave lengths much longer than those to which the eye is sensitive. This radiation when examined with a spectrograph is found to have a continuous spectrum in which a plot of intensity or energy vs. wave length will describe a smooth curve (see 24 of FIG. 2). If, however, the spectrograph or detector is located some distance from the hot body in the atmosphere, the actual energy distribution at the detector is not a smooth curve like 24 of FIG. 2 for various gases such as water vapor and/or carbon dioxide in the path between the detector and object or target absorb energy from certain frequencies of the spectrum. At any particular absorption band the energy absorbed depends upon the path length, the average density of the absorbing gas, and to some lesser extent the pressure. Thus the distance to a hot object may be determined if certain of the following facts are known:

(1) The average density and distribution of the absorbing gas.
(2) The fraction of energy absorbed by the gas (or some related factor).
(3) The atmospheric pressure (altitude) at the detector.
(4) The temperature of the object (or some related factor).

Measuring distance or range by the use of infrared radiation absorption spectra analysis can be accomplished by using either the water vapor carbon dioxide absorption bands, since the other major constituents like $O_2$ and $N_2$ of the atmosphere do not have absorption bands in the infrared. Such a ranging method depends upon a determination of the concentration or distribution of the absorbing gas. Preliminary investigations indicate that the percentage of $CO_2$ in the atmosphere is relatively constant up through 100,000 ft. Therefore, the preferable method uses the $CO_2$ bands, for this relatively uniform and constant atmospheric distribution of $CO_2$ makes the determination of $CO_2$ density primarily a function of the altitude.

One object of this invention is the provision of a ranging device which does not reveal itself.

Another object is the provision of a ranging device less vulnerable to jamming techniques commonly used to disrupt radar and radio direction-finding equipment.

A further object is to provide a system which indicates the distance to the object by the fractional absorption in an individual absorption band.

Another object is to provide a system for obtaining information from the target as to its temperature, so the fraction of energy absorbed by $CO_2$ and/or water in the path can be determined and related to the distance the target is from the ranging system.

A further object is to provide a device to take into account (compensate for) the different densities of the absorbing gas at various altitudes.

Another object is the provision in a system of means which takes into account (compensates for) the fact that the average (effective) path density of the absorbing gas differs from the density at the detector when the target and detector do not lie in the same horizontal plane.

Other objects and advantages of the invention will be apparent from the following description in which certain preferred embodiments of the invention are disclosed.

FIG. 5 is a graph which shows the relative relationship of the transmitted intensities of the wave lengths on either side of the absorption band when the rays strike the compensating filter at the proper angle;

FIG. 6 is a diagram of a single band infrared ranging system;

FIG. 6a is a detail elevational view of one of the filter discs employed in the system depicted in FIG. 6;

FIG. 7 is a diagram of a multi-band infrared range system;

FIG. 7a is a detail elevational view of the filter disc employed in the system set forth in FIG. 7; and FIG. 8 is a graph which shows the relative relationship of altitude and $CO_2$ density in the atmosphere of the earth.

Figure 1:
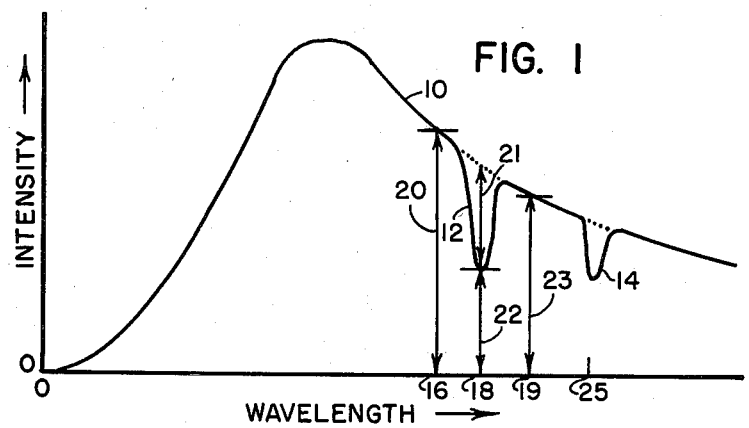
FIGURE 1 is a graph on which is plotted the intensity or energy versus wave length of the electromagnetic radiation emitted by a hot body.

Referring to FIG. 1, a plot of the continuous spectrum 10 of a hot body as viewed thru a thickness of atmosphere, illustrates that the actual energy distribution is not a smooth curve. Absorption of energy from the infrared spectrum by $CO_2$ in the atmosphere occurs at absorption bands centered near various wave lengths illustrated by irregularities 12 and 14 in the otherwise smooth curve 10. For a target of known temperature, fractional absorption $$\frac{21}{21+22}$$

of an individual $CO_2$ absorption band centered near a wave length 18 can be related to the ratio of energies at two wave lengths. The two wave lengths can be either 16 and 18 or 19 and 18. Wave lengths 16 and 19 lie just outside the region of absorption 12 and wave length 18 lies in the absorption region 12. The wave lengths 16 and 19 are similar in length to the wave length 18. The intensities at wave lengths 16, 19, and 18 can be measured and are depicted by numerals 20, 23, and 22 respectively. As an example, when determining $CO_2$ absorption, wave length 18 can be 2.12 microns and wave lengths 16 and 19 can be 1.6 microns and 2.3 microns respectively.

Figure 2:
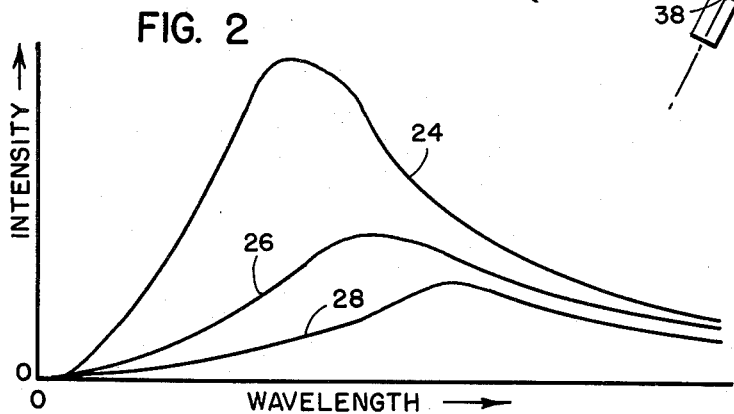
FIG. 2 is a graph which illustrates how the radiant energy distribution emitted by an object shifts with varying temperatures.

In FIG. 2, curves 24, 26, and 28 illustrate how the radiant energy distribution from an object or target source shifts with varying temperatures. Curve 26 is produced by an object which is cooler than the object which produced curve 24. Likewise curve 28 is produced by an object which is cooler than the object which produced curve 26.

Figure 3:
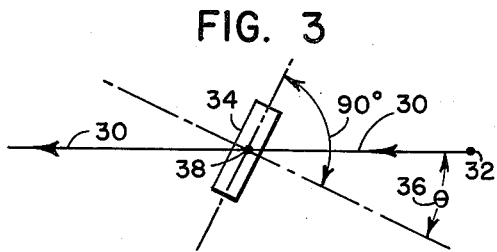
FIG. 3 is a plane view of a moveable interference filter in the path of rays emitted by an object.

FIG. 3 shows radiation distribution 30 from an object 32 penetrating a compensating interference filter 34. The angle 36 at which the radiation 30 strikes the filter 34 can be varied by rotating the filter about an axis 38.

Figure 4:
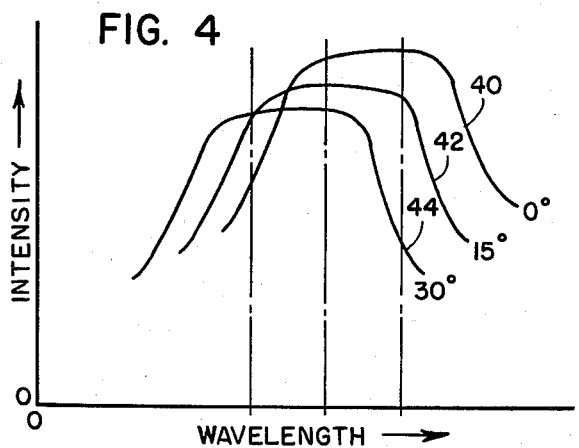
FIG. 4 is a graph illustrating how the band pass frequency depends upon the angle at which the emitted rays strike the interference filter.

In FIG. 4, curves 40, 42, and 44 illustrate a property common to interference filter 34, i.e., that its band pass frequency is a function of the angle 36 of incident radiation. Curve 40 pictures the band pass frequency passed by the filter 34 when the angle 36 of the incident radiation is 0°. Curves 42 and 44 are the transmission characteristics for the filter 34 when the angle 36 of incident radiation is 15° and 30° respectively. Thus the filter 34 is able to selectively attenuate intensities of given wave lengths depending upon the angular position 36.

FIG. 5 illustrates that when a compensating filter such as 34 reaches the proper angle 36, the transmitted intensities of wave lengths such as 16 and 19 of FIG. 1 can be made to appear equal; that is, the radiation of wave lengths 16 and 19 emitted by the target 32 as viewed through the filter 34 placed at the proper angle 36 appear like wave lengths 46 and 48 with equal magnitudes of intensity 50 and 52.

Referring now to FIG. 6, the preferred embodiment of the single band infrared ranging system includes a broad band compensating interference filter 58, a beam splitter 60, beam reflectors 62, 64 and 66, and a radiation detector 68 which is connected to a servomotor 70 through an amplifier 72. The servomotor 70 controls an angle 71 similar to angle 36 of FIG. 3 at which the interference filter 58 is maintained. Also comprising this system is another interference filter 74 operated by a servomotor 76. A radiation detector 78 is associated with the servomotor 76 by an amplifier 80. A potentiometer 81 linked to the servomotor 76 transmits information to a computer section 82.

The computer section 82 receives additional information from an altitude corrector 84 and a vertical angle corrector 86.

The altitude corrector 84 comprises a pressure sensitive altimeter 85 mechanically connected to a potentiometer 87 so that the potentiometer 87 will emit a signal representative of the altitude of the infrared ranging system. The vertical angle corrector 86 includes a directional device 89 associated with a potentiometer 91. The potentiometer 91 emits a signal representative of the vertical angle formed between the horizontal plane through the filter 58 and a straight line drawn between said filter 58 and the infrared source 56 whose radiation is being analyzed by the infrared ranging device.

The computor section 82 comprises two function storage means 93 and 95 for storing non linear function information such as illustrated in FIG. 8 and an H function generator 97. The H function generator 97 is linked to the altitude corrector 84 through the function storage means 93 and 95, is linked to the vertical angle corrector 86 through the function storage means 95, and is linked to the potentiometer 81.

A synchronous motor 88 rotates two filter discs 90 and 92. The disc 90 contains alternate quarter filter sections 94 and 96 as shown in FIG. 6a and the disc 92 contains sections 94a and 96a.

FIG. 7 shows a second embodiment that the invention may assume. This second embodiment is a multi-band ranging system comprising a target temperature section 100, an absorption detection section 102, and a computor section 104. Radiation 106 from an infrared source or object 108 strikes a beam splitter 110. Part of the radiation 106 passes through an optical wedge 112 and then a filter disc 114 to a radiation detector 116. A motor 118 rotates the filter disc 114 which includes alternate sections of filters 120 and 122 (shown in FIG. 7a).

A servomotor 124 which moves the wedge 112 receives energy from the detector 116 via an amplifier 128. Linked to the servomotor 124 is a potentiometer 126.

The absorption detection section 102 comprises a reflecting chopper 130 rotated by a motor 132, three reflectors 134, 136, and 138, and $CO_2$ cell 140 and a radiation detector 142. A servomotor 144 is connected to the detector 142 through an amplifier 146. The servomotor 144 is linked to a grey wedge or comb attenuator 148 via a potentiometer 150. Both the potentiometer 126 and the potentiometer 150 feed energy into a T function generator 151 which is connected to a H function generator 152 of the computor section 104.

Besides the H function generator 152, the computor section 104 includes a function storage 153 and a function storage 155. An altitude corrector 154 and a vertical angle corrector 156 are associated with the H function generator 152 through the function storages 153 and 155. The function storages 153 and 155, the altitude corrector 154 and the vertical angle corrector 156 are similar to the function storages 93 and 95, the altitude corrector 84, and the vertical angle corrector 86 shown in FIG. 6 and previously described in this specification.

In operation, the single band system, FIG. 6, receives radiation 54 from the object or target 56 through the interference filter 58. This radiation 54 is passed to the beam splitter 60 whereby part of the radiation is directed to reflector 62 and some to reflector 64. The radiation which reaches reflector 62 is directed to reflector 66 and from there to the rotating filter disc 90 containing the alternate sections of filter 94 and 96. Sections 94 and 96 absorb all radiation that strikes them except that at wave lengths 16 and 19 respectively. The unabsorbed radiation at wave lengths 16 and 19 passes through to the detector 68. As illustrated in FIG. 1, different wave lengths like 16 and 19 may have different magnitudes of intensity 20 and 23 depending on the temperature of the target. Assuming the sections like 94 and 96 pass wave lengths 16 and 19, any difference in the intensities 20 and 23 of the two wave lengths results in modulation of energy at detector 68.

The error signal, that is, the difference between magnitudes 20 and 23, thus generated acts through the amplifier 72 and the servomotor 70 to tilt or angle the broad band compensating filter 58 into a position so as to attenuate the stronger wave length. The activation of the filter 58 by the servomotor continues until the intensities of the wave lengths appear equal and the error signal disappears. Thus, the filter 58 compensates for the different magnitudes 20 and 23 in wave lengths 16 and 19 respectively and equalizes the magnitudes of intensity of the wave lengths lying on either side of the absorption band centered at wave length 18. When the filter 58 reaches the proper angle, the radiation 54 from the object 56 as viewed through the filter 58 appears as in FIG. 5 where wave lengths 46 and 48 correspond to wave lengths 16 and 19 of FIG. 1 respectively. The intensities denoted by the numerals 50 and 52 have been derived from radiation unattenuated by $CO_2$, thus either of these intensities provide a first signal, optical in character, dependent upon the temperature of the infrared source 56. That is, the intensities 50 and 52 carry information which is representive of the temperature of object 56. Wave length 45 corresponds to wave length 18 of FIG. 1 which is the approximate center of the absorption band.

With the incoming radiation 54 normalized, i.e., the density 50 made to appear to equal intensity 52, the $CO_2$ absorption monitoring section comprising the filter disc 92, the filter 74, the detector 78, the amplifier 80, the servomotor 76 and the potentiometer 81 is able to transmit a signal representative of the fractional absorption of energy transmitted in the band centered at wave length 45. This is accomplished by comparison of the optical signal intensity 50 of the reference wave length 46 and the intensity 43 at wave length 45, the intensity 43 being in effect a second optical signal representative of the remaining energy at wave length after attenuation by the $CO_2$ present in the atmosphere between the source 56 and the filter 58. The normalized beam from filter 58 strikes reflector 64 and is then passed through rotating filter disc 92 containing alternate sections of filters 94a and 96a, similar to those sections 94 and 96 comprising the filter disc 90. Section 94a passes the energy signal at wave length 46 while section 96a passes the energy signal at wave length 45. The difference in intensity 41 between the signals at wave length 46 and wave length 45 results in modulation of energy at detector 78. The difference 41 in energy contained in the two optical signals mentioned immediately above acts through the amplifier 80 and the servomotor 76 to actuate the potentiometer 81 and the broad band compensating filter 74 which attenuates the magnitude 50 of the wave length 46 until absorption and reference energies 50 and 43 appear equal and the error signal at detector 78 disappears. Filter 74 functions in the same manner as filter 58 previously described. Thus, the position of filter 74 becomes an index of the fraction of energy absorbed by the $CO_2$ in the sensing path between the ranging system and the infrared source or object 56. This indication is converted to electrical terms by the potentiometer 81 which is mechanically coupled to the filter 74. Both the filter 74 and the potentiometer 81 are driven by the servomotor 76. The voltage signal provided by the potentiometer 81 is passed on to the computor section 82.

This potentiometer 81 signal, which is electrical in character, constitutes a signal containing sufficient information for computing the distance between the source 56 and the filter 58 when both the source and filter are at the same elevation and the density of $CO_2$ at said elevation is known. This follows from the fact that the fractional absorption of energy, A, by $CO_2$ is related to some function, $f$, of the effective (average) density, $\rho$, of $CO_2$ lying in the most direct line between the infrared source 56 and the filter 58 of the ranging device disclosed in FIG. 6, some function, $f_1$, of the distance, D, between said source and said device, and some function, $f_2$, of the pressure, $p$, at the elevation of said device. This relationship can be expressed generally as follows:

(1) $\qquad A = f(\rho) \times f_1(D) \times f_2(p)$

However, work to date indicates that atmospheric percent (%) concentration of $CO_2$ is relatively constant with height. The density ($\rho$) of $CO_2$ varies with pressure (altitude) so that for our purposes where the source 56 and filter 58 are at the same elevation the effective (average) density of the $CO_2$ can be determined from pressure or altitude measurements and published data. Thus for our purposes (2) $\qquad \rho = Kp$ and for all our calculations we may therefore re-write (1) as (3) $\qquad A = f_x(pD)$ For the case in which the source 56 does no lie in the same plane as the filter 58, there is an additional variable, the vertical angle, $\phi$, which is the angle formed between the horizontal plane through the filter 58 of said ranging device and the straight line between said filter 58 and the infrared source 56 whose radiation is being analyzed by said ranging device. So that now for our purpose Equation 3 becomes (4) $\qquad A = f_y(pD) \times f(\phi)$ Thus when said source 56 and said filter 58 are at different elevations the signal from the potentiometer 81 must be corrected for vertical angle, $\phi$, in addition to pressure, $p$ (altitude of the filter 58) in order to make said signal indicative of the true distance between said source 56 and said filter 58.

This is accomplished as follows. The function storage 93 which contains the non linear function information of the relationship between $CO_2$ density and altitude (FIG. 8) receives a signal indicative of the altitude of the ranging system from the altitude corrector 84. Upon receipt of said signal said function storage 93 passes on to the H function generator 97 a signal indicative of the $CO_2$ density at the altitude of the filter 58. At approximately the same time the function storage 95 which contains the same non linear function information mentioned above receives a signal from the altitude corrector 84 indicative of the altitude of the ranging system and a signal from the vertical angle corrector 86 which is indicative of the vertical angle, $\phi$. Upon receipt of said signals said function storage 95 passes to the H function generator 97 a signal indicative of the rate of change of the effective $CO_2$ density at said angle. The H function generator then emits a signal representative of the distance between said source 56 and said filter 58. Said signal being some function H of the signals from the function storage 93, the function storage 95 and the potentiometer 81.

The preferred embodiment of an infrared ranging system which does not rely on any method for isolating a particular absorption band is shown in FIG. 7. This system makes use of all $CO_2$ absorption bands such as those centered about wave lengths 18 and 25 of FIG. 1 through a wave length range from the near infrared to beyond five microns. Because this method utilizes a major portion of the emitted target energy (not just a narrow band of frequencies), it is inherently capable of greater ranges than the single band system.

The multi-band system operates in the following general manner. Referring to FIG. 7, the radiation path 106 contains some $CO_2$ molecules. This path includes a region of atmosphere between the object 108 and the apparatus comprising the present system. The distance between the object 108 and the beam splitter 110 has been given the reference numeral 107. By means of the beam splitter 110, the reflecting chopper 130, and the reflector 138, the reflectors 134 and 136 are exposed to the radiation 106 of the object 108. The branch between the chopper 130 and the reflector 134 contains a cell 140 of $CO_2$. When a beam of energy is passed through the cell 140, the intensities in the $CO_2$ absorption bands such as those centered about wave lengths similar to 18 and 25 of FIG. 1 are attenuated severely with many wave lengths being totally absorbed. A 12 inch cell of 100% $CO_2$ is equivalent in absorptivity to approximately 3500 feet of atmospheric $CO_2$ at STP. Because of this it is possible to use a cell 140 of 100% $CO_2$ as a subtractive filter. The arrangement of the chopper 130 and the reflector 138 in the two path optical system shown in FIG. 7 subjects both reflectors 134 and 136 to energy arriving from the same radiation source 108. The ratio of energy transmitted to reflectors 134 and 136 will vary with the incremental changes in concentration of the $CO_2$ in the external path 107. In other words, if a major portion of energy is subtracted in the $CO_2$ cell 140, small variations of absorptive concentration in the external path 107 have little effect on the total energy level at the reflector 134 but are able to effect appreciable changes in the energy level at the reflector 136. These energy levels are picked up and compared by the detector 142.

Optically the multi-band system comprises two separate sections, a target temperature section 100 which furnishes a corrective factor based on changes in target energy distribution, and an absorption detection section 102 which monitors the fractional energy absorbed by the $CO_2$ bands in the infrared spectrum.

In operation part of the radiation 106 is directed into the target temperature section 100 by the beam splitter 110 while the rest continues on toward the reflecting chopper 130. The segment of radiation 106 which is directed into the temperature section 100 passes through the optical wedge 112, preferably made of glass, and then the filter 114 on its way to the detector 116.

As is well known in the art a given thickness of glass will attenuate the intensities of certain different wave lengths by different amounts. Thus a given thickness of the wedge attenuates the intensities 20 and 23 of wave lengths like 16 and 19 of FIG. 1 in varying degrees so they appear equal. This is illustrated in FIG. 5 where wave lengths 16 and 19 show up as wave lengths 46 and 48 respectively with intensities 20 and 23 appearing like intensities 50 and 52 after the radiation 106 passes through the correct thickness of the wedge 112. The wedge 112 permits a convenient method for smoothly varying this thickness as the wedge is moved further into or out of the path of the radiation.

The sections 120 and 122 of the filter 114 operate the same as sections 94 and 96 of filter 90, passing wave lengths such as 46 and 48 of FIG. 5 corresponding to wave lengths 16 and 19 of FIG. 1. Any difference in the intensities of 20 and 23 between wave lengths 16 and 19 results in modulation of energy at the detector 116. This difference acts through the amplifier 128 and the servomotor 124 to actuate the potentiometer 126 and to move the wedge 112 in and out of the path of radiation 106. The wedge 112 moves in or out until the magnitudes 20 and 23 appear equal. This condition is illustrated in FIG. 5 where wave lengths 16 and 19 correspond to wave lengths 46 and 48. Information on the position of the potentiometer 126, when this condition is obtained, is fed to the T function generator 151 as an electrical signal representative of the temperature of the source 108, since we have been dealing at this time with wave energy arriving from the source 108 that has not been attenuated by whatever $CO_2$ exists between said source and the beam splitter 110. The signal from the potentiometer 126 is dependent upon the temperature of the infrared source 108. That is, said signal contains information which is representative of the temperature of source 108.

The absorption detection section 102 is basically a two-path null system. Incoming radiation 106 from the target 108 alternately traverses the path to the reflector 134 and then the path to the reflector 136 to the common detector 142. Each path may be considered as transmitting pulses of energy of equal duration. The reference path traverses the cell 140 filled with 100% $CO_2$. The sample path between reflectors 138 and 136 traverses a path relatively free of $CO_2$. In this sample path the energy transmitted to reflector 136 is attenuated by the grey wedge or comb 148 driven by the servomotor 144.

Target radiation passing through the $CO_2$ cell 140 has energy subtracted in all $CO_2$ absorption band wave lengths. The comb attenuator 148 reduces the over-all energy in the sample path by an equal magnitude, keeping the system in balance. This balance is continuously maintained by means of error-correcting signals from the detector 142. Any inequalities between the reference and sample path's transmitted energy generates a modulated correcting signal at the detector 142 which acts through the servomotor 144 and the potentiometer 150 to adjust the position of the comb 148 and thereby restore energy balance.

By means of mechanically coupling the potentiometer 150 to the comb 148, the comb's position is translated into electrical values. The electrical signal thus produced is essentially a function of the number of $CO_2$ molecules in the external path 107 (uncorrected for variations in target temperatures). Hence the signal from the potentiometer 150 is dependent upon the number of $CO_2$ molecules between the ranging system and the infrared source 108. That is, said signal contains information which is representative of the number of $CO_2$ molecules in path 106.

To convert these signals from the potentiometers 150 to path length, they are fed into the T function generator 151 where they are analyzed with information received from the potentiometer 126 which is indicative of the relative temperature of the infrared source 108. The T function generator 151 emits a signal indicative of the number of $CO_2$ molecules in the path 107 corrected for target temperature. Said signal being some function T of the signals from the potentiometers 126 and 150.

The output from said generator 151, corresponding substantially to the signal from the potentiometer 81, is fed to the H function generator 152.

The altitude corrector 154 and the vertical angle corrector 156 through their associated function storages 153 and 155 feed information in to the H function generator in the same manner as the altitude corrector 84 and the vertical angle corrector 86. The H function generator analyses all the signals it receives and then emits a signal representative of the distance 107. Said signal being some function H of the signals from the function storage 153, the function storage 155 and the T function generator 151.

Another embodiment of the invention (not shown) would have the potentiometer 126 and the potentiometer 150 connected directly to the H function generator 152. Then any signals from the potentiometers 126 and 150 will be analyzed in said generator 152 along with the signals from the function storage 153 and the function storage 155 so that the H function generator can calculate the distance 107 between the ranging device and the target.

We have, in the drawings, and specification, presented a detailed disclosure of the preferred embodiment of our invention. It is to be understood that the invention is susceptible of modification, structural changes, and various applications of use within the spirit and scope of the invention and we do not plan to limit the invention to the specific form disclosed, but rather intend to cover all modifications, changes and alternative construction and methods falling within the scope of the principles taught of our invention.

What is claimed is:

1. An apparatus for determining the distance to an infrared radiation source through a medium containing an absorptive constituent, said constituent being capable of attenuating the intensities of various wave lengths of said radiation, comprising means for providing a first signal which is representative of the temperature of said radiation source, means for providing a second signal which is representative of the intensity which is absorbed by said absorptive constituent, and means for comparing said first and second signals to provide a third signal which is indicative of said distance.

2. An apparatus as described in claim 1 with a computer means for transforming said third signal so said distance can be read directly.

3. An apparatus as described in claim 1 with means for producing a fourth signal representative of the altitude, and means for interpreting said third and fourth signals to provide a fifth signal representative of said distance.

4. An apparatus as described in claim 1 with means for producing a fourth signal representative of the vertical angle, and means for interpreting said third and fourth signals to provide a fifth signal representative of said distance.

5. An apparatus as described in claim 1 with means for producing a fourth signal representative of the pressure altitude, means for producing a fifth signal representative of the vertical angle between said source and said apparatus, and means for combining said third, fourth, and fifth signals capable of providing a sixth signal representative of said distance.

6. An apparatus for determining the distance to an infrared radiation source through a medium containing an absorptive constituent, said constituent being capable of attenuating the intensities of various wave lengths of said radiation, comprising means for providing a first signal which is representative of the difference between the intensities of two unattenuated wave lengths, means for producing a second signal representative of the absorption of at least one attenuated wave length, and means for comparing said first and second signals providing a third signal indicative of said distance.

7. An apparatus for determining the distance to an infrared radiation source through a medium containing an absorptive constituent, said constituent being capable of attenuating the intensities of various wave lengths of said radiation, comprising means for comparing the intensities of two unattenuated wave lengths capable of providing a first signal representative of the temperature of said radiation source, means for providing a second signal representative of said absorption of at least one attenuated wave length, and means for using said first and second signals to produce a third signal indicative of said distance.

8. An apparatus for determining the distance to an infrared radiation source through a medium containing an absorptive constituent with said constituent capable of attenuating the intensities of various wave lengths of said radiation, comprising a temperature compensating means for normalizing the intensities of two unattenuated wave lengths, an absorption detection means for receiving said normalized radiation capable of providing a signal representative of the absorption of at least one of said attenuated wave lengths by said absorptive constituent and means of converting said signal to said distance.

9. An apparatus for determining the distance to an infrared radiation source through a medium containing an absorptive constituent, said constituent being capable of attenuating the intensities of various wave lengths of said radiation, comprising means for normalizing the intensities of two unattenuated wave lengths, an absorption detection means for receiving said normalized intensities capable of producing a first signal representative of the difference between said normalized intensities and the intensity of one of said attenuated wave lengths and means for converting said first signal to said distance.

10. An apparatus as described in claim 9 with means for producing a second signal representative of the altitude and means for comparing said first and second signals which provides a third signal representative of said distance.

11. An apparatus as described in claim 9 with means for producing a second signal representative of the vertical angle and means for comparing said first and second signals which provides a third signal representative of said distance.

12. An apparatus as described in claim 9 with means for producing a second signal representative of the altitude, means for producing a third signal representative of the vertical angle between said source and said apparatus, and means for analyzing said first, second, and third signals which provides a fourth signal representative of said distance.

13. An apparatus for determining the distance to an infrared radiation source through a medium containing an absorptive constituent, said constituent being capable of attenuating the intensities of various wave lengths of said radiation, comprising a temperature compensating means for producing a first signal representative of the difference between the intensities of two unattenuated wave lengths, an absorption detection means for producing a second signal indicative of the amount of absorption of at least one of said attenuated wave lengths, means for producing a third signal representative of the altitude of said apparatus, means for producing a fourth signal indicative of the vertical angle between said source and said apparatus, and means for analyzing said first, second, third, and fourth signals giving a fifth signal indicative of said distance.

14. An apparatus for determining the distance to an infrared radiation source through a medium containing an absorptive constituent, said constituent being capable of attenuating the intensities of various wave lengths of said radiation, comprising a temperature compensating means for producing a first signal indicative of the difference between the intensities of two unattenuated wave lengths, means for producing a second signal representative of the amount of absorption by said absorptive constituent of at least one of said attenuated wave lengths, means for producing a third signal representative of the altitude of said apparatus, means for producing a fourth signal indicative of the average density of the absorptive constituent lying between said apparatus and said source, and computing means for interpreting said first, second, third, and fourth signals capable of providing a fifth signal indicative of said distance.

15. An apparatus for determining the distance to an infrared radiation source through a medium containing an absorptive constituent, said constituent being capable of attenuating the intensities of various wave lengths of said radiation, comprising a temperature compensating means for providing a first signal representative of the difference between the intensities of two unattenuated wave lengths, means for producing a second signal representative of the amount of absorption of the intensities of said attenuated wave lengths, means for comparing said first and second signals, capable of producing a third signal representative of said distance, means for producing a fourth signal representative of the vertical angle between said apparatus and said source, and means for interpreting said third and fourth signals to produce a fifth signal indicative of said distance.

16. An apparatus for determining the distance to an infrared radiation source through a medium containing an absorptive constituent, said constituent being capable of attenuating the intensities of various wave lengths of said radiation, comprising a temperature compensating means for producing a first signal representative of the difference between the intensities of two unattenuated wave lengths, said signal being used to normalize the intensities of the two said unattenuated wave lengths, an absorption section for producing a second signal representative of the difference between said normalized intensities and the intensity of one of said attenuated wave lengths, means for providing a third signal representative of the average path density of said absorptive constituent, and means for converting said second and third signals to said distance.

17. An apparatus for determining the distance to an infrared radiation source through a medium containing an absorptive constituent, said constituent being capable of attenuating the intensities of various wave lengths of said radiation, comprising a temperature compensating means for producing a first signal indicative of the difference between the intensities of two unattenuated wave lengths, an absorption detection means capable of producing a second signal representative of the amount of absorptive constituent between said apparatus and said source, means for producing a third signal representative of the average amount of said absorptive constituent in the path between said apparatus and said source, and means for analyzing said first, second, and third signals capable of producing a fourth signal representative of the distance between said source and said apparatus.

(References on following page)

References Cited in the file of this patent

UNITED STATES PATENTS

| | | |
|---|---|---|
| 2,830,487 | Griffith | Apr. 15, 1958 |
| 2,842,760 | McLucas | July 8, 1958 |
| 2,919,350 | Taylor | Dec. 29, 1959 |
| 2,927,212 | Shimukonis et al. | Mar. 1, 1960 |
| 2,951,160 | McCartney | Aug. 30, 1960 |

OTHER REFERENCES

Infrared Challenges Radar's Monopoly, by Phillip J. Klass, Aviation Week, Mar. 4, 1957, pp. 50–54, 57, 59 and 61.